United States Patent [19]
Boardman et al.

[11] Patent Number: 5,706,320
[45] Date of Patent: Jan. 6, 1998

[54] CONTAINMENT PRESSURE SUPPRESSION SYSTEM FOR LIQUID METAL COOLED REACTORS

[75] Inventors: Charles Edward Boardman, Saratoga; Marvin Man-Wai Hui, Cupertino, both of Calif.

[73] Assignee: General Electric Company, Schenectady, N.Y.

[21] Appl. No.: 585,879

[22] Filed: Jan. 16, 1996

[51] Int. Cl.⁶ .................. G21C 9/004; G21C 19/303
[52] U.S. Cl. .................. 376/283; 376/285; 376/293; 376/309; 376/314; 376/911; 55/256
[58] Field of Search .................. 376/283, 293, 376/309, 313, 314, 911, 285; 55/256, DIG. 9; 261/122.1, 125

[56] References Cited

U.S. PATENT DOCUMENTS

| | | | |
|---|---|---|---|
| 4,610,840 | 9/1986 | Leach | 376/283 |
| 4,859,405 | 8/1989 | Squarer et al. | 376/314 |
| 4,927,596 | 5/1990 | Minnick | 376/283 |
| 5,017,331 | 5/1991 | Eckardt | 376/283 |

*Primary Examiner*—Daniel D. Wasil
*Attorney, Agent, or Firm*—Armstrong, Teasdale, Schlafly & Davis

[57] ABSTRACT

A pressure suppressing and aerosol scrubbing system configured to be located between low pressure upper containments associated with modular reactor vessels is described. In one embodiment, the pressure suppression and scrubbing system includes a water tank having connected, partially filled water chambers and a vertical baffle having horizontal vent holes positioned near the bottom of the tank. Each water chamber is connected by a vent/relief line to one of the respective rectangular upper containments. The partially filled water tank assures that the respective containments are isolated from each other under normal operating conditions due to the water trap inherent in the system. In the event that an accident occurs in one of the reactors, the affected containment is heated by the sodium spray and/or pool fire and such heat forces its way through the pressure suppressing and scrubbing system to the unaffected reactor containment. The suppressing and scrubbing system cools the gasses and removes sodium and fission products so that relatively few radioactive fission products are introduced into the containment volume associated with un-affected reactor containment and the containment design temperature and pressure can be reduced.

18 Claims, 4 Drawing Sheets

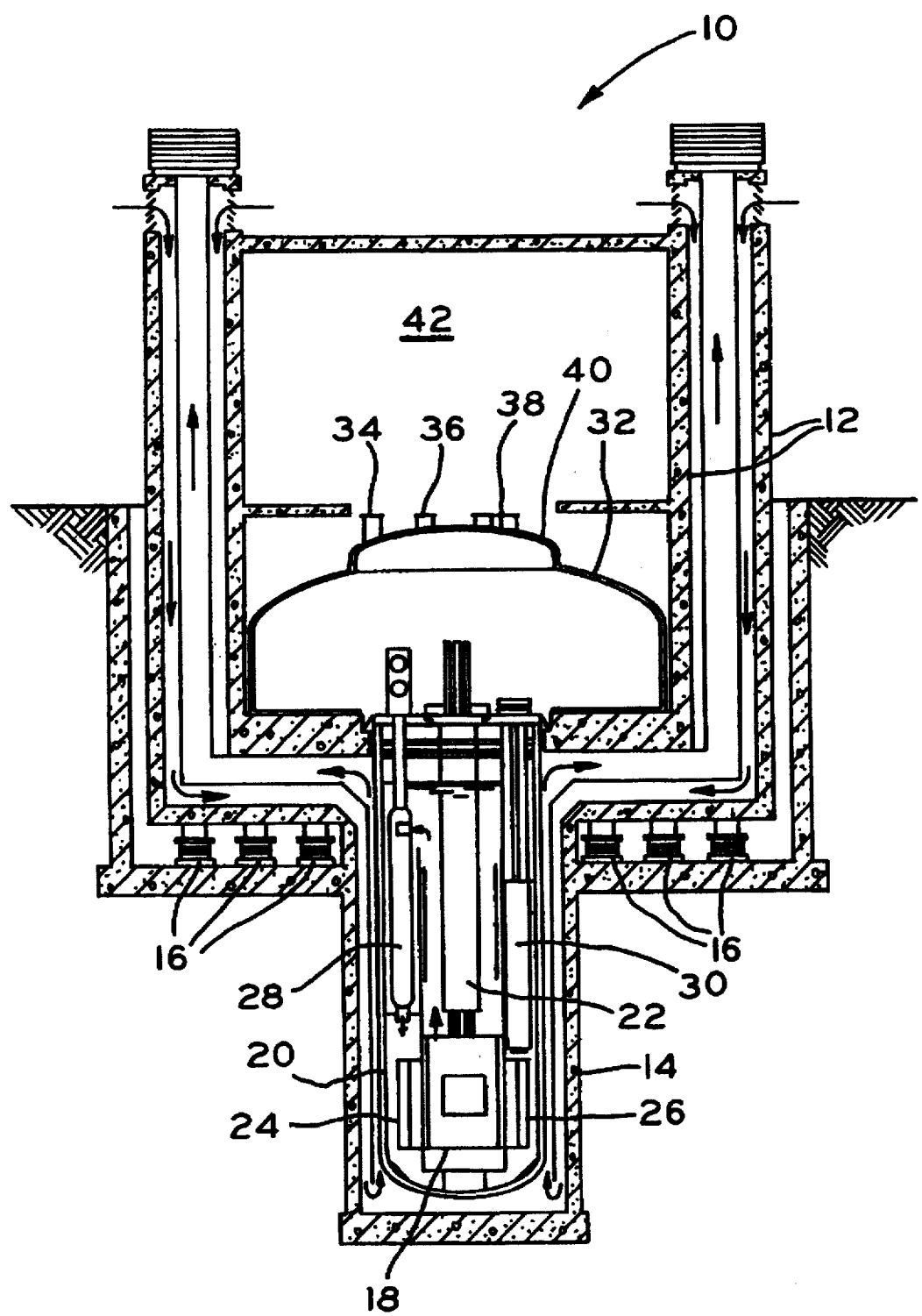
FIG_1
(PRIOR ART)

CONTAINMENT PRESSURE SUPPRESSION SYSTEM FOR LIQUID METAL COOLED REACTORS

FIELD OF THE INVENTION

This invention relates generally to liquid metal cooled reactors and, more particularly, to a passive pressure suppression system for such reactors.

BACKGROUND OF THE INVENTION

Although liquid metal cooled reactor (LMR) coolant systems operate at atmospheric pressure, LMR containment systems typically are configured to withstand significant temperature and pressure challenges to contain very severe design basis accidents. The most severe of the containment related design basis accidents assume that the energetic hypothetical core disassembly accident ("HCDA") has occurred and that the reactor closure has been breached. Under such a severe design basis accident, the subsequently formed sodium pool and/or sodium spray fires will heat the incontainment atmosphere and increase its pressure and temperature. Using the U.S. Advanced Liquid Metal Reactor (ALMR) design as an example, analysis has indicated that to successfully contain such postulated sodium pool and/or spray fires, the upper containment dome must withstand an internal pressure of 25 psig at a temperature of 700° F.

To meet the pressure and temperature requirements set forth above yet the cost of the containment from exceeding a practical value, the upper containment dome typically is configured to be as small as possible and of one inch thick steel. Although such a containment dome satisfies the pressure and temperature requirements, a significant drawback of a small upper containment is the limited working space for refueling and most maintenance operations. Due to the limited space within the upper containment, refueling and other major maintenance operations cannot be accomplished without opening maintenance hatches in the upper containment dome (i.e., opening the containment). More specifically, refueling and maintenance of major components, including the control rod drives, the primary pumps and intermediate heat exchangers as well as portions of the refueling system and the in-core instrumentation, are performed with the use of special adapters and "long reach" tools from the head access room located directly above the containment dome. The head access room which is located above the containment dome provides the necessary equipment lay down areas and component lifting capabilities via a permanent gantry crane.

It would be desirable to reduce the pressure and temperature requirements of the upper containment so that the quantities of steel and concrete in the containment building can be reduced while at the same time improving accessibility for refueling and maintenance operations. It also would be desirable to provide a containment which is more tolerant against postulated events, including providing an effective trap for the fission products as well as the Na-22 and Na-24 that are postulated to enter the containment region in a postulated accident.

SUMMARY OF THE INVENTION

These and other objects are attained by a pressure suppressing and aerosol scrubbing system configured to be located between low pressure upper containments associated with modular reactors. In one embodiment, the pressure suppression and scrubbing system includes a water tank having separate, coupled water chambers. A vertical baffle having horizontal vent holes is positioned near the bottom of the tank. Each water chamber is connected by a vent/relief line to one of the respective upper containments.

In operation, the water tank is partially filled with water to assure that the respective upper containments are isolated from each other under normal operating conditions due to the water trap inherent in the system. In the event that an accident occurs in one of the modular reactors, the affected containment is heated by the sodium spray and/or pool fire and such heated containment volume forces its way through the containment venting and scrubbing system to the unaffected reactor containment. Such venting causes the water level on the higher pressure chamber to be forced down to a level below that of the horizontal vent holes in the vertical baffle. After this level is reached, the hot high pressure sodium and fission product laden gases are forced through the horizontal vent holes and allowed to bubble up through the water volume on the other side of the vertical baffle, i.e., through the lower pressure chamber. Such a configuration results in a scrubbing action which cools the gasses and removes sodium and fission products so that relatively few radioactive fission products are introduced into the upper containment associated with unaffected reactor and the containment design temperature and pressure can be reduced.

The above described pressure suppressing and aerosol scrubbing system enables reducing the pressure and temperature requirements of the upper containments. As a result, no metal containment dome is required and accessibility for refueling and maintenance operations is improved. Such system also provides an effective trap for the fission products as well as the Na-22 and Na-24 that are postulated to enter the containment region in a postulated accident.

BRIEF DESCRIPTION OF THE DRAWINGS

FIG. 1 is a schematic, cross section view of a liquid metal cooled nuclear reactor.

DETAILED DESCRIPTION OF THE DRAWINGS

Figure 2A:
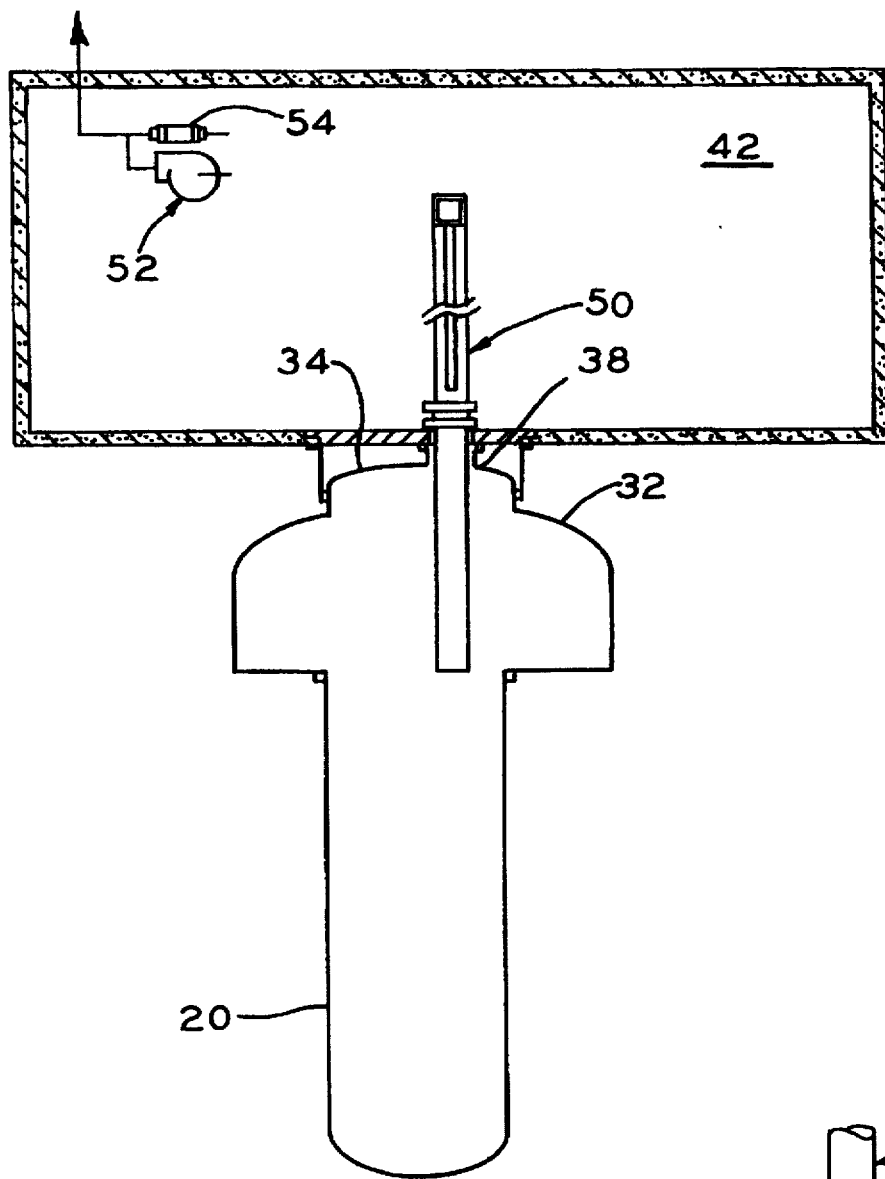
FIGS. 2A and 2B are schematic views of certain reactor components shown in FIG. 1.

FIG. 1 is a schematic, cross section view of a known liquid metal cooled nuclear reactor 10. Reactor 10 includes an upper reactor building 12 and a reactor silo 14. Upper reactor building 12 is supported partially within silo 14 by supports 16. A reactor core 18 is positioned within a reactor vessel 20 in silo 14. Control rod drives 22, shields 24 and 26, heat exchanger 28 and pump 30 also are located within reactor vessel 20.

An upper containment dome 32, including hatches 34, 36 and 38, is positioned over reactor vessel 20. Containment dome 32 has a generally cylindrical shape with a semi-spherical top 40. To satisfy pressure and temperature requirements, upper containment dome 32 typically is configured to be as small as possible and formed of one inch thick steel. With such a configuration, however, there is limited working space for refueling and most maintenance operations.

Due to the limited working space, refueling and maintenance of major components, including control rod drives 22, primary pumps 28 and 30, and heat exchangers 24 and 26, are performed with the use of special adapters and "long reach" tools from head access room 42 located directly above containment dome 32. Head access room 42 provides the necessary equipment lay down areas and component lifting capabilities via a permanent gantry crane (not shown).

Figure 2B:
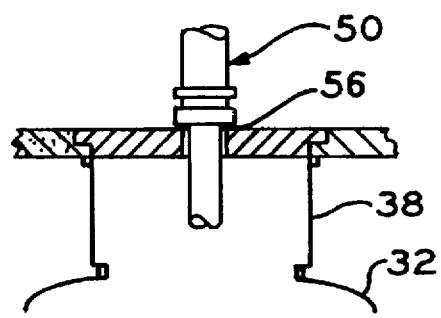

More specifically, and referring to FIGS. 2A and 2B which are schematic views of certain components of reactor 10 shown in FIG. 1, when a repair or maintenance operation is performed, a cask and adapter gate valve assembly 50 is utilized to access components. More specifically, and by way of example, assembly 50 is located over and aligned with hatch 38. When hatch 38 is opened, tools extend from assembly 50 through hatch 38 and into vessel 20. Such tools are used to perform the necessary repair or maintenance. Once such repair or maintenance is complete, the tools are withdrawn from vessel 20 into assembly 50 and hatch 38 is closed.

An exhaust system 52, including a standby gas treatment filter 54, is located within head access room 42. Also, as shown in FIG. 2B, an inflatable seal 56 is used to seal off containment dome 32 from head access room 42. Although room 42 is not part of the reactor containment, such room 42 must provide acceptable protection against postulated design basis accidents that could occur during refueling and maintenance operations when the upper containment volume is interconnected with head access room 42. To mitigate design basis maintenance and refueling accidents, head access room 42 functions as a low leakage enclosure that is maintained at a negative pressure by exhaust system 52 when containment dome 32 is breached, e.g., hatch 38 is open, for refueling and other maintenance operations.

Figure 3:
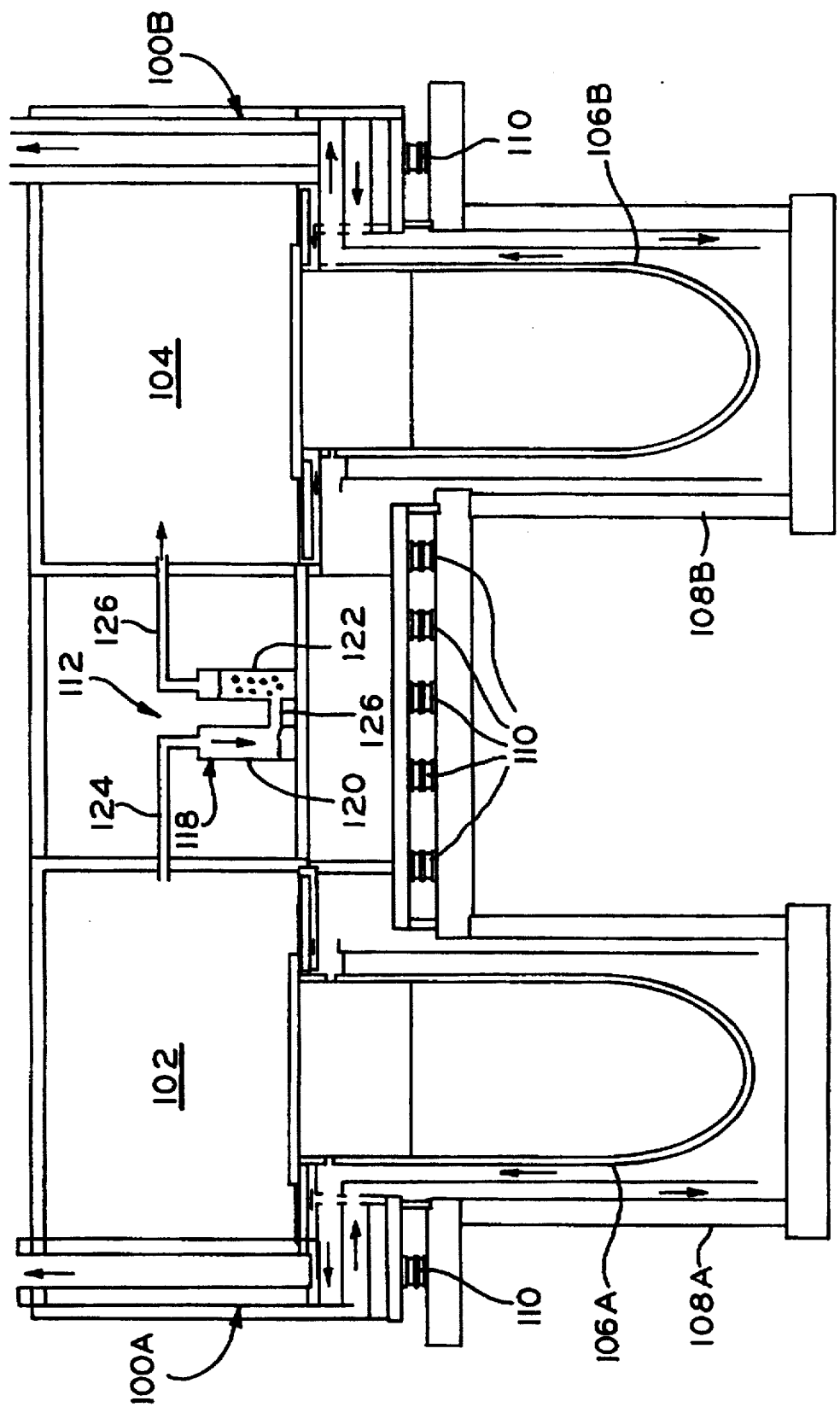
FIG. 3 is a schematic, cross-section view of a liquid metal cooled nuclear reactor including a pressure suppressing and aerosol scrubbing system in accordance with one embodiment of the present invention.

Upper containments 102 and 104 having reduced pressure and temperature requirements yet also improving accessibility for refueling and maintenance operations, as compared to containment 32, are shown in FIG. 3. As compared to containment 32, containments 102 and 104 also are believed to be more tolerant against postulated events, including providing an effective trap for fission products as well as the Na-22 and Na-24 that are postulated to enter the containment region in a postulated accident.

More specifically, FIG. 3 illustrates two (2) modular nuclear reactors 100A and 100B including reactor vessels 106A and 106B located within reactor silos 108A and 108B, respectively. Reactors 100A and 100B and their associated containments 102 and 104 are supported partially over silos 108A and 108B, respectively, by supports 110 which provide horizontal seismic isolation. Although not shown in FIG. 3, respective reactor cores are positioned within reactor vessels 106A and 106B. Control rod drives, shields, heat exchangers, and pumps (not shown) also are located within each reactor vessel 106A and 106B.

Figure 4:
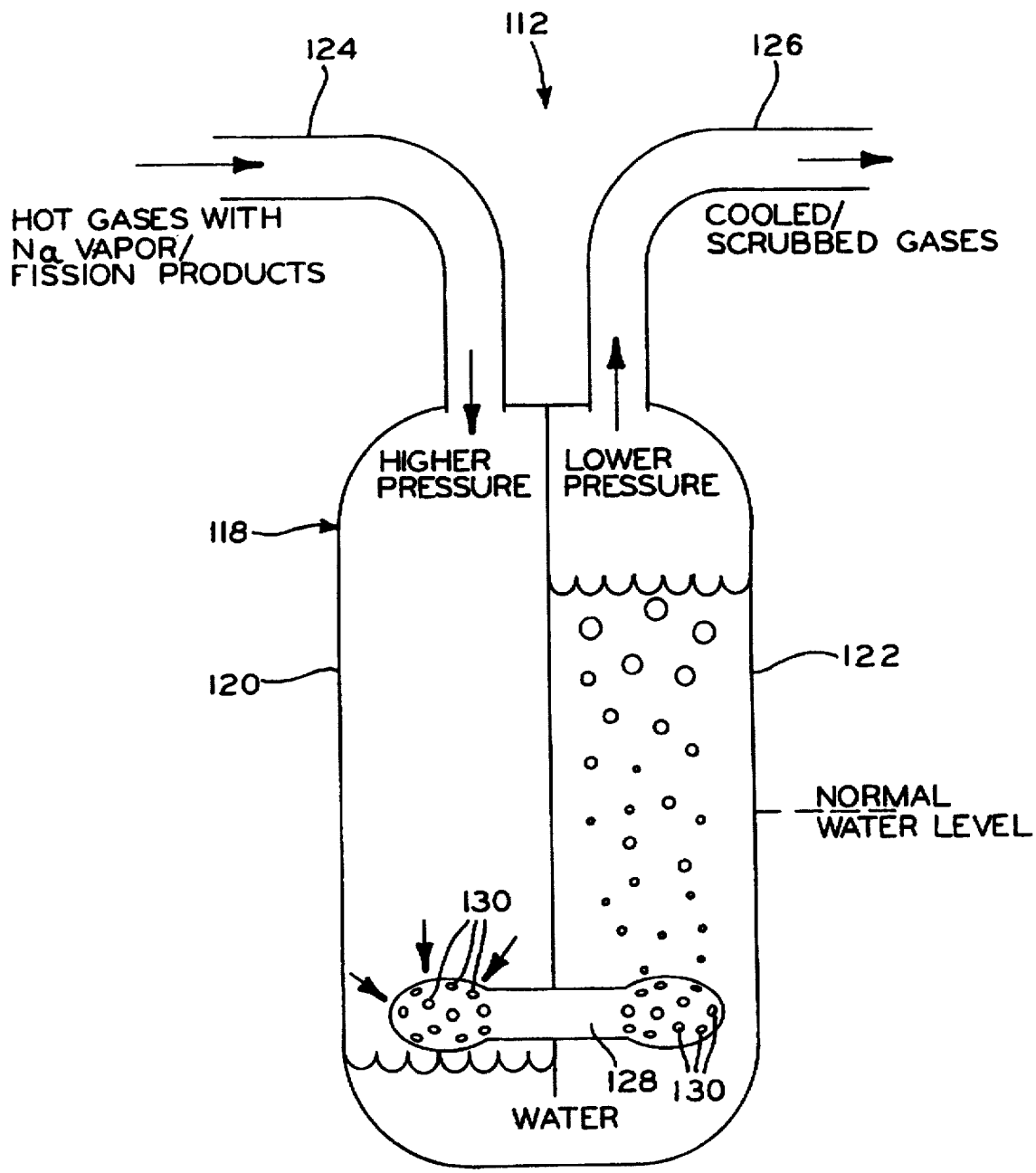
FIG. 4 is a schematic, cross-section view of the pressure suppressing and aerosol scrubbing system including a vertical baffle.

A pressure suppressing and aerosol scrubbing system 112 is located between low pressure, substantially rectangular shaped, upper containments 102 and 104 associated with reactor vessels 106A and 106B, respectively. Pressure suppressing and scrubbing system 112 includes a water tank 118 having separate water chambers 120 and 122. In FIG. 3, chambers 120 and 122 are coupled by a pipe or conduit 123 located at an elevation above the bottom of tank 118 so that chambers 120 and 122 are in flow communication. Gases and liquids may travel through conduit 123 as described below. Water tank 118 including a vertical baffle 128 having vent holes 130 positioned in a lower section, or near the bottom, of tank 118 is shown in FIG. 4. Each chamber 120 and 122 is connected by a vent/relief line 124 and 126 to one respective upper containment 102 or 104.

Partially filled water chambers 120 and 122 provide that containments 102 and 104 are isolated from each other under normal operating conditions due to the water trap inherent in system 112. In the event that an accident occurs in one reactor vessel 106A or 106B, associated upper containment 102 or 104 is heated by the sodium spray and/or pool fire, and such heated containment volume will force its way through containment venting and scrubbing system 112 to unaffected upper containment 102 or 104. Such venting causes the water level in higher pressure chamber 120 or 122 to be forced down to a level below that of conduit 123 or vent holes 130 in the vertical baffle. After this level is reached, the hot high pressure sodium and fission product laden gases are forced through conduit 123 or vent holes 130 and allowed to bubble up through the water volume on the other side of the vertical baffle, i.e., lower pressure chamber 120 or 122. Such a configuration results in a scrubbing action which cools the gasses and removes sodium and fission products so that relatively few radioactive fission products are introduced into the containment volume associated with unaffected reactor containment 102 or 104.

Using system 112, the design pressure of upper containments 102 and 104 can be reduced by a factor of six (6) or more. With respect to one known liquid metal reactor, it is believed that the upper containment pressure can be reduced to less than four (4) psig versus twenty-five (25) psig in the known reactor. Further, the temperature in containments 102 and 104 can be reduced from hundreds of degrees Fahrenheit above ambient to a much lower temperature since a relatively small quantity of high temperature atmosphere in containments 102 and 104 will not contain sufficient stored energy to raise the temperature of the massive rectangular upper containments 102 and 104. Such reductions in the containment pressure and temperature make it possible to eliminate the containment dome while at the same time improving accessibility for refueling and maintenance operations.

In addition, and importantly, the combination of upper containments 102 and 104 and system 112 is more tolerant against postulated events that exceed the containment design basis event. Specifically, upper containments 102 and 104 readily accommodate sodium spray fires that exceed the present design basis in which it is postulated that an HCDA causes a breach in the reactor closure and that 100 lbs. of sodium is sprayed into containments 102 and 104 where it quickly heats containments 102 or 104 by both direct contact and a vigorous chemical reaction between the oxygen in containments 102 and 104 and the sodium. Further, the scrubbing action of system 112 provides an effective trap for most fission products as well as the Na-22 and Na-24 that are postulated to enter upper containments 102 and 104 in a postulated accident. Key fission products that can be removed by system 112 include Sr, Ba, Te Ru, Cs, Rb, Br, and I in addition to any fuel materials Pu and minor actinides. System 112 therefore enables containment design basis pressure and temperature to be reduced while scrubbing and cleaning the vented gases prior to introducing such gases to the "unaffected" reactor containment volume.

From the preceding description of the present invention, it is evident that the objects of the invention are attained. Although the invention has been described and illustrated in detail, it is to be clearly understood that the same is intended by way of illustration and example only and is not be taken by way of limitation. For example, although pressure suppressing and aerosol scrubbing system 112 is described above in the context of a reactor having two (2) modular reactors, system 112 could be used in connection with reactors having more than two (2) modular reactors. Accordingly, the spirit and scope of the invention are to be limited only by the terms of the appended claims.

What is claimed is:

1. A pressure suppressing and aerosol scrubbing system for use in connection with a liquid metal cooled reactor, the reactor including at least two modular reactor vessels and respective upper containments associated with each reactor vessel, said pressure suppressing and aerosol scrubbing system comprising a water tank including first and second water chambers, said first and second water chambers being in flow communication.

2. A pressure suppressing and aerosol scrubbing system in accordance with claim 1 wherein said first and second chambers are connected to respective first and second vent lines, each of said vent lines having an open end in communication with one of the upper containments.

3. A pressure suppressing and aerosol scrubbing system in accordance with claim 1 wherein said first and second water chambers are partially filled with water.

4. A pressure suppressing and aerosol scrubbing system in accordance with claim 3 wherein the upper containments are isolated from each other in normal operating conditions due to a water trap formed by said first and second chambers.

5. A pressure suppressing and aerosol scrubbing system in accordance with claim 3 wherein if an accident occurs in one of the reactor vessels, the associated upper containment is heated and such heated containment volume forces its way through said system to another upper containment.

6. A pressure suppressing and aerosol scrubbing system in accordance with claim 5 further comprising a vertical baffle having vent holes positioned in a lower section of said water tank, and wherein if the water level in said first chamber is forced to a level below said vent holes in said vertical baffle, hot high pressure sodium and fission product laden gases are forced through said vent holes and bubble up through the water volume in said second chamber.

7. A pressure suppressing and aerosol scrubbing system in accordance with claim 6 wherein causing said gasses to bubble up through the water volume in said second chamber results in cooling the gasses and removes sodium and fission products therefrom.

8. A method for reducing pressure and temperature in upper containments of a liquid metal cooled reactor, the reactor including at least two modular reactor vessels and respective upper containments associated with each reactor vessel, said method comprising the steps of:

locating a water tank including first and second water chambers in flow communication between the upper containments;

partially filling the water tank with water; and connecting the first and second water chambers to respective first and second vent lines, each of the vent lines having an open end in communication with one of the upper containments.

9. A method in accordance with claim 8 wherein the containments are isolated from each other in normal operating conditions by a water trap formed by the first and second chambers.

10. A method in accordance with claim 8 wherein if an accident occurs in one of the reactor vessels, the associated upper containment is heated and such heated containment volume forces its way through the water tank to another upper containment.

11. A method in accordance with claim 10 wherein the water tank has a vertical baffle with vent holes positioned in a lower section thereof, and if the water level in the first chamber is forced to a level below the vent holes in the vertical baffle, hot high pressure sodium and fission product laden gases are forced through the vent holes and bubble up through the water volume in the second chamber.

12. A method in accordance with claim 11 wherein causing the gasses to bubble up through the water volume in the second chamber results in cooling the gasses and removing sodium and fission products therefrom.

13. A pressure suppressing and aerosol scrubbing system for use in connection with a nuclear reactor including at least two modular reactor vessels and respective upper containments associated with each reactor vessel, said pressure suppressing and aerosol scrubbing system comprising:

a water tank including first and second water chambers, said first and second water chambers being in flow communication; and first and second vent lines, one end of each of said vent lines in flow communication with one of said water chambers and having an open end in communication with one of the upper containments.

14. A pressure suppressing and aerosol scrubbing system in accordance with claim 13 wherein said first and second water chambers are partially filled with water.

15. A pressure suppressing and aerosol scrubbing system in accordance with claim 14 wherein the upper containments are isolated from each other in normal operating conditions due to a water trap formed by said first and second chambers.

16. A pressure suppressing and aerosol scrubbing system in accordance with claim 14 wherein if an accident occurs in one of the reactor vessels, the associated upper containment is heated and such heated containment volume forces its way through said system to another upper containment.

17. A pressure suppressing and aerosol scrubbing system in accordance with claim 16 further comprising a vertical baffle having vent holes positioned in a lower section of said water tank, and wherein if the water level in said first chamber is forced to a level below said vent holes in said vertical baffle, hot high pressure sodium and fission product laden gases are forced through said vent holes and bubble up through the water volume in said second chamber.

18. A pressure suppressing and aerosol scrubbing system in accordance with claim 17 wherein causing said gasses to bubble up through the water volume in said second chamber results in cooling the gasses and removes sodium and fission products therefrom.

* * * * *